United States Patent
Okano et al.

(10) Patent No.: US 11,788,687 B2
(45) Date of Patent: Oct. 17, 2023

(54) METHOD OF MANUFACTURING PRESSURE ACCUMULATOR

(71) Applicants: JFE Steel Corporation, Tokyo (JP); JFE Container Co., Ltd., Tokyo (JP)

(72) Inventors: Hiroshi Okano, Tokyo (JP); Akihide Nagao, Tokyo (JP); Nobuyuki Ishikawa, Japan (JP); Kazuki Matsubara, Tokyo (JP); Toshio Takano, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 441 days.

(21) Appl. No.: 17/253,951

(22) PCT Filed: Jun. 21, 2019

(86) PCT No.: PCT/JP2019/024751
§ 371 (c)(1),
(2) Date: Dec. 18, 2020

(87) PCT Pub. No.: WO2019/245036
PCT Pub. Date: Dec. 26, 2019

(65) Prior Publication Data
US 2021/0270421 A1   Sep. 2, 2021

(30) Foreign Application Priority Data
Jun. 22, 2018 (JP) ................................. 2018-118454

(51) Int. Cl.
*F17C 13/02* (2006.01)

(52) U.S. Cl.
CPC ...... *F17C 13/02* (2013.01); *F17C 2201/0104* (2013.01); *F17C 2203/0636* (2013.01);
(Continued)

(58) Field of Classification Search
CPC .............. F17C 13/02; F17C 2201/0104; F17C 2203/0636; F17C 2203/0663;
(Continued)

(56) References Cited

U.S. PATENT DOCUMENTS

| 6,479,992 B2 * | 11/2002 | Kato ...................... G01N 27/82 72/11.1 |
| 8,240,209 B2 * | 8/2012 | Murakami ........... G01N 29/227 73/587 |
| 2010/0107765 A1 * | 5/2010 | Murakami ........... G01N 29/043 73/587 |

FOREIGN PATENT DOCUMENTS

| CN | 1373852 A | 10/2002 |
| CN | 103216725 A | 7/2013 |

(Continued)

OTHER PUBLICATIONS

Maede et al.; JP2017223564; A Pressure Tank Inspection Method, Inspection System and Inspection Program; Dec. 21, 2017; EPO English Machine Translation; pp. 1-12 (Year: 2023).*
(Continued)

*Primary Examiner* — Bayan Salone
(74) *Attorney, Agent, or Firm* — DLA Piper LLP (US)

(57) ABSTRACT

A method of manufacturing a pressure accumulator, using an AE signal for the pressure accumulator, includes: a first estimation step of estimating with an AE sensor provided at the pressure accumulator, a range of stress levels at each of which a damage AE signal that is generated from the pressure accumulator because of damage of material of the pressure accumulator is in a predetermined state; and a first design step of designing the pressure accumulator such that a minimum thickness of the pressure accumulator is determined based on the stress level range estimated in the first estimation step.

8 Claims, 8 Drawing Sheets

(52) U.S. Cl.
CPC .. *F17C 2203/0663* (2013.01); *F17C 2209/22* (2013.01); *F17C 2221/012* (2013.01)

(58) Field of Classification Search
CPC .......... F17C 2203/0617; F17C 2209/22; F17C 2221/012; F17C 2223/0123; F17C 2223/035; F17C 2223/036; F17C 2250/0465; F17C 2260/015; G01M 5/0033; G01N 2291/0258; G01N 2291/02827; G01N 29/14; F16J 12/00; Y02E 60/32
See application file for complete search history.

(56) References Cited

FOREIGN PATENT DOCUMENTS

| | | | |
|---|---|---|---|
| CN | 105473929 | A | 4/2016 |
| CN | 106323385 | A | 1/2017 |
| CN | 206800474 | | 12/2017 |
| JP | 2012-242336 | | 12/2012 |
| JP | 2012242336 | A * | 12/2012 |
| JP | 2013-160285 | | 8/2013 |
| JP | 2013160285 | A * | 8/2013 |
| JP | 2017-223564 | | 12/2017 |
| JP | 2017223564 | A * | 12/2017 |
| WO | 2009/008515 | | 1/2009 |
| WO | WO-2009008515 | A1 * | 1/2009 ........... G01N 29/043 |
| WO | 2014/057987 | | 4/2014 |
| WO | WO-2014057987 | A1 * | 4/2014 ............. G01N 29/14 |

OTHER PUBLICATIONS

Examination Report dated May 12, 2021, of counterpart Indian Application No. 202027055038, along with an English translation.
Notice of Reasons for Refusal dated Jun. 1, 2021, of counterpart Japanese Application No. 2020-525824, along with an English translation.
Second Notice of Reasons for Refusal dated May 24, 2022, of counterpart Chinese Patent Application No. 201980041895.4, along with an English translation.
The First Office Action dated Dec. 21, 2021, of counterpart Chinese Patent Application No. 201980041895.4, along with an English Translation.
Extended European Search Report dated Feb. 10, 2022, of counterpart European Patent Application No. 19822713.4.
Decision of Rejection dated Jan. 11, 2023, of counterpart Chinese Patent Application No. 201980041895.4, along with an English machine translation.
Communication Pursuant to Article 94(3) EPC dated Apr. 3, 2023, of counterpart European Patent Application No. 19 822 713.4.

* cited by examiner

DISTANCE m FROM AE SENSOR 11b

METHOD OF MANUFACTURING PRESSURE ACCUMULATOR

TECHNICAL FIELD

This disclosure relates to a method of manufacturing a pressure accumulator that is sealed, with a high-pressure gas such as hydrogen or another kind of gas, enclosed in the pressure accumulator, and a life extension method for the pressure accumulator.

BACKGROUND

In an existing technique, a diagnosis is made using acoustic emission (hereinafter referred to as AE) to determine the life of a bearing provided in a rotary machine (see Japanese Unexamined Patent Application Publication No. 2012-242336, for example). In the technique disclosed in Japanese Unexamined Patent Application Publication No. 2012-242336, a reference maximum amplitude value of an AE signal and a maximum amplitude value of an AE signal for a bearing that is in use are compared to each other, to thereby estimate the life of the bearing as the result of a diagnosis.

The estimation of a life based on an AE signal can also be applied to a pressure accumulator that is sealed, with a high-pressure gas such as hydrogen, for example, enclosed in the pressure accumulator. It should be noted that in the technique disclosed in Japanese Unexamined Patent Application Publication No. 2012-242336, the maximum amplitude value of the AE signal is periodically acquired, and the life of the bearing is estimated by a diagnosis. A repetitive lifetime diagnosis is unsuitable for a pressure accumulator whose life is estimated, for example, only by annual safety inspection. Furthermore, for the pressure accumulator whose lift is estimated, for example, only by annual safety inspection, the safety inspection is required to reliably detect an AE signal without fail.

It could therefore be helpful to provide a method of manufacturing a pressure accumulator, which enables an AC signal to be reliably detected without fail.

SUMMARY

We thus provide:
[1] A method of manufacturing a pressure accumulator, using an AE signal for the pressure accumulator, the manufacturing method includes:
  a first estimation step of estimating with an AE sensor provided at the pressure accumulator, a range of stress levels at each of which a damage AE signal generated from the pressure accumulator because of damage of material of the pressure accumulator is in a predetermined state; and
  a first design step of designing the pressure accumulator such that a minimum thickness of the pressure accumulator is determined based on the stress level range estimated in the first estimation step.
[2] In the method of manufacturing the above item [1], in the first estimation step, the AE sensor provided at the pressure accumulator estimates that the range of the stress levels at each of which the damage AE signal generated from the pressure accumulator because of the damage of the material is in the predetermined state is a range between stress levels that are 0.25 times to 1.50 times higher than the level of a fatigue limit stress.

[3] The method of manufacturing the above item [1] or [2] further includes:
  a second estimation step of estimating a fatigue limit until which hydrogen degradation in the fatigue characteristic does not become apparent, based on influence of hydrogen on a fatigue characteristic of the material of the pressure accumulator; and
  a second design step of designing the pressure accumulator such that the minimum thickness of the pressure accumulator is determined based on a stress level that is lower than or equal to the fatigue limit estimated in the second estimation step.
[4] The method of manufacturing any one of the above items [1] to [3] further includes a removal step of removing a decarburized layer on at least an inner surface of the inner surface and an outer surface of a base material of the pressure accumulator.
[5] In the method of manufacturing any one of the above items [1] to [4], the pressure accumulator includes an AE sensor provided at the pressure accumulator to detect the AE signal.
[6] In the method of manufacturing any one of the above items [1] to [5], the pressure accumulator includes:
  a container made of metal and having an opened portion; and
  a lid member provided at the opened portion of the container to close the opened portion.
[7] In the method of manufacturing the above item [6], the AE sensor is provided at one or both of the container and the lid member.
[8] In the method of manufacturing the above item [6] or [7], the container is a metallic cylinder member having both end portions that are opened, and the lid member closes the opened portions of the both end portions of the metallic cylinder member.
[9] In the method of manufacturing the above item [8], the pressure accumulator includes a carbon-fiber reinforced resin member that covers an outer circumferential portion of the metallic cylinder member.

According to the method of manufacturing the pressure accumulator, the AE sensor provided at the pressure accumulator estimates the range of the stress levels at each of which the AE signal generated from the pressure accumulator because of the damage of the material of the pressure accumulator is in the predetermined state, and the pressure accumulator is designed such that the minimum thickness is determined based on the estimated stress level range. Thus, when the pressure accumulator is damaged due to fatigue and in use, the AE sensor detects an AE signal from the pressure accumulator whose signal degree is a prominent signal degree in which the AE signal is in the predetermined state. Therefore, even in a pressure accumulator whose life is determined as a diagnosis, for example, only by annual safety inspection, an AE signal can be reliably detected without fail, in the safety inspection.

REFERENCE SIGNS LIST 1 container
1a metallic cylinder member
2 lid member
3 sealing member
4 carbon-fiber reinforced resin member
10 pressure accumulator
11a, 11b AE sensor
12 non-destructive sensor
13 estimation unit
100 life estimation apparatus
S21 first estimation step
S22 first design step
S23 second estimation step
S24 second design step
S25 decarburized-layer removal step

DETAILED DESCRIPTION

A pressure accumulator according to a preferred example will be described below in detail with reference to the drawings. The example described below is a preferred specific example of the pressure accumulator. Therefore, the following description includes various limitations concerning technically preferred configurations. However, the scope of this disclosure is not limited to such configurations unless the disclosure contains a description to the effect that a configuration is limited as described herein.

Configuration of Life Estimation Apparatus 100 for Pressure Accumulator 10

Figure 1:
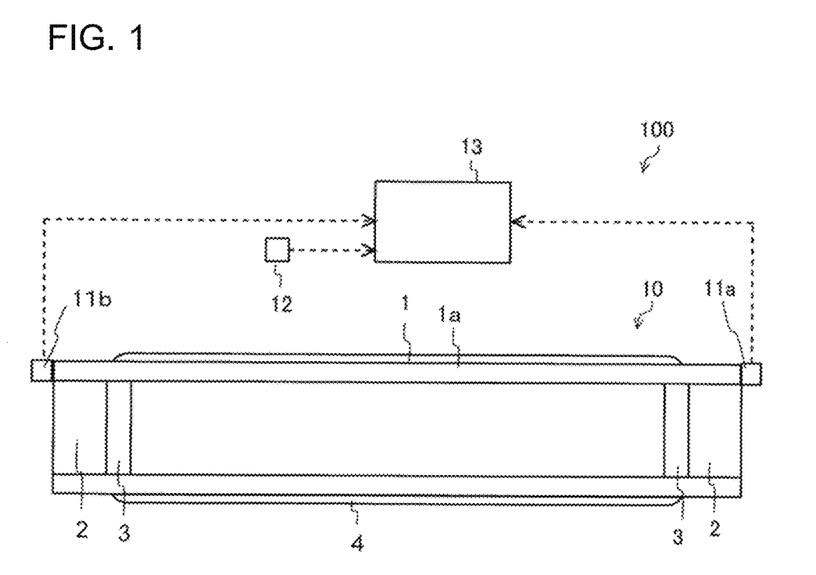
FIG. 1 is a schematic configuration diagram illustrating a life estimation apparatus for a pressure accumulator, according to an example.

FIG. 1 is a schematic configuration diagram illustrating a life estimation apparatus 100 for a pressure accumulator 10, according to an example. As illustrated in FIG. 1, the life estimation apparatus 100 includes a pressure accumulator 10, two AE sensors 11a and 11b, a non-destructive sensor 12 and an estimation unit 13. The life estimation apparatus 100 estimates the life of the pressure accumulator 10, based on AE signals for the pressure accumulator 10.

Accumulator 10

In the pressure accumulator 10, hydrogen is stored, for example, in a hydrogen station. The pressure accumulator 10 includes a container 1 that is made of metal and that has opened portions, and lid members 2 that are provided at the opened portions of the container 1 to close the opened portions. To be more specific, the container 1 is a metallic cylinder member 1a having the opening portions at both end portions of the metallic cylinder member 1a, and the lid members 2 close the respective opened portions at the both end portions of the metallic cylinder member 1a. On inner sides of the lid members 2 in the container 1, sealing members 3 that seal the inside of the container 1 are provided. In the container 1, a carbon-fiber reinforced resin member 4 is provided to cover an outer circumferential portion of the metallic cylinder member 1a. The carbon-fiber reinforced resin member 4 is provided to secure a mechanical strength of the pressure accumulator 10 that is a required pressure resistance, and is wound in such a manner as to cover a storage member at an outer circumference surface of the metallic cylinder member 1a.

Metallic Cylinder Member 1a

The metallic cylinder member 1a is made of a low-alloy steel, for example. That is, the metallic cylinder member 1a is made of a material containing any one of chrome-molybdenum steel, nickel-chrome-molybdenum steel, manganese-chrome steel, manganese steel and boron-containing steel, for example.

Carbon-Fiber Reinforced Resin Member 4

The carbon-fiber reinforced resin member 4 is a layer that ensures the mechanical strength of the pressure accumulator 10 that is a required pressure resistance, and is wound to cover the storage member on the outer circumference surface of the metallic cylinder member 1a. The carbon-fiber reinforced resin member 4 is a composite material in which a carbon fiber is used as a reinforcement and is impregnated with a resin to enhance the strength and, for example, a PAN based carbon fiber or a PITCH based carbon fiber is used.

The PAN based carbon fiber is used for various purposes, for example, for aircraft, and is widely spread. The PITCH based carbon fiber has a lower strength than that of the PAN based carbon fiber, but has a higher elastic modulus and thus a higher stiffness than those of the PAN based carbon fiber. For example, the Young's modulus of the PITCH based carbon fiber is 620 GPa or 780 GPa, whereas the Young's modulus of the PAN based carbon fiber is 230 GPa. Thus, the PITCH based carbon fiber has a high elastic modulus and thus has a high stiffness compared to the PAN based carbon fiber. By contrast, the tensile strength TS of the PITCH based carbon fiber is 3600 GPa, whereas the tensile strength TS of the PAN based carbon fiber is 5000 GPa. Thus, the PAN based carbon fiber has a higher strength than that of the PITCH based carbon fiber.

Lid Member 2

The lid members 2 are attached to the end portions of the metallic cylinder member 1a and used to close the metallic cylinder member 1a. In at least one of the lid members 2, a valve not illustrated is provided, and is used to enclose or release a substance in or from the metallic cylinder member. In the lid member 2 or the lid members 2, a through-hole or through-holes are formed for connection of the valve or valves.

AE Sensors 11a and 11b

The two AE sensors 11a and 11b are provided at the pressure accumulator 10, and each detect an AE signal. The number of the AE sensors 11a and 11b to be provided is one or more, and preferably, should be two or more. When two or more AE sensors 11a and 11b are provided, it is possible to locate a fatigue damage part of the pressure accumulator 10 based on a relative difference between AE signals detected by the two or more AE sensors 11a and 11b. The two AE sensors 11a and 11b are provided at the both end portions of the container 1. One or more AE sensors 11a and 11b may be provided at the container 1 and/or the lid member or members 2. The AE sensors 11a and 11b are set on a surface of a target material, and each detect an AE wave generated by formation of a crack in the material, as an AE signal. The AE sensors 11a and 11b may be set at the pressure accumulator 10 only at the time at which a safety inspection is made. That is, it is not indispensable that the AE sensors 11a and 11b are set at all times at the pressure accumulator 10. The two AE sensors 11a and 11b are each used to detect a damage AE signal generated from the pressure accumulator 10 because of damage of the material during use of the pressure accumulator 10. The damage AE signal generated because of the above damage includes an AE signal generated because of a fatigue damage.

Non-Destructive Sensor 12

The non-destructive sensor 12 detects a fatigue crack depth that is the depth of a fatigue crack, according to a non-destructive inspection method. As the non-destructive inspection method for use in the non-destructive sensor 12, for example, an ultrasonic testing, a magnetic particle testing or an eddy current testing is used. Of these methods, preferably, the eddy current testing, which enables a crack having a size of 0.1 mm or more to be detected, should be used. Therefore, the non-destructive sensor 12 detects the fatigue crack depth according to the eddy current testing. The non-destructive sensor 12 may be set at the pressure accumulator 10 only when the AE sensors 11a and 11b each detect an AE signal indicating that a crack is formed in the material. That is, it is not indispensable that the non-destructive sensor 12 is set at all times at the pressure accumulator 10.

Estimation Unit 13

Figure 2:
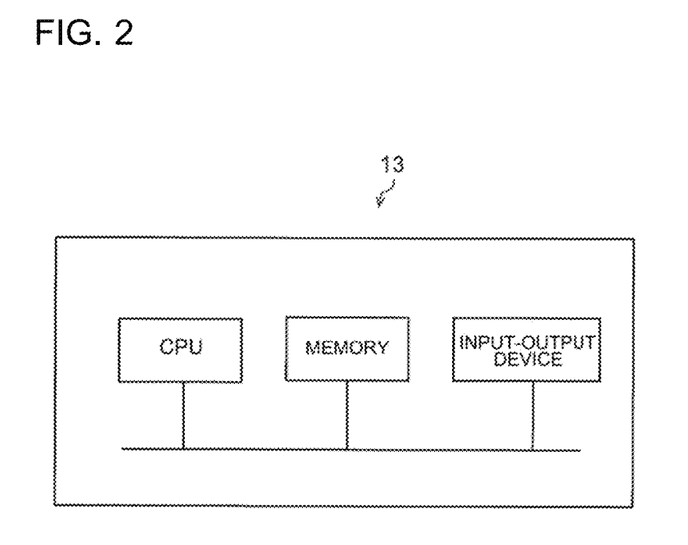
FIG. 2 is a block diagram illustrating an estimation unit according to the example.

FIG. 2 is a block diagram illustrating the estimation unit 13 according to the example. As illustrated in FIG. 2, the estimation unit 13 is a processing circuit provided with a microcomputer that includes a CPU, a memory such as a ROM and a RAM, and an input/output device such as an I/O port. The estimation unit 13 receives signals from the two AE sensors 11a and 11b and the non-destructive sensor 12, wirelessly or through a communication wire. The estimation unit 13 may be set at the pressure accumulator 10 only at the time at which the safety inspection is performed; that is, it is not indispensable that the estimation unit 13 is set at all times at the pressure accumulator 10.

When the AE sensors 11a and 11b detect damage AE signals generated from the pressure accumulator 10 because of damage of the material during use of the pressure accumulator 10, the estimation unit 13 determines the time point at which the AE signals are detected as a minimum initial flaw generation time point that is the time point at which a minimum initial flaw at the pressure accumulator 10 is generated in shipping the pressure accumulator 10, the detection of generation of the minimum initial flaw being detected by the non-destructive inspection method. As the non-destructive inspection method for use in detection of generation of the minimum initial flaw at the pressure accumulator 10 in the shipping of the pressure accumulator 10, for example, an ultrasonic testing, a magnetic particle testing or an eddy current testing is used. Of these methods, preferably, the magnetic particle testing, which enables a 0.3 mm crack to be detected, should be used. Therefore, the magnetic particle testing is used in detection of generation of the minimum initial flaw at the pressure accumulator 10 in the shipping of the pressure accumulator 10, and 0.3 mm is set as the size of the minimum initial flaw. When the AE sensors 11a and 11b are set at all times at the pressure accumulator 10, first damage AE signals can be immediately detected for the estimation unit 13. When the AE sensors 11a and 11b are set at the pressure accumulator 10 only at the time when the safety inspection is performed, the frequency of the safety inspection is set such that first damage AE signals can be detected for the estimation unit 13 when the size of the crack is smaller than or equal to 0.3 mm, which is the size of the minimum initial flaw that can be detected in the magnetic particle testing.

In addition, the estimation unit 13 specifies a fatigue damage part of the pressure accumulator 10 based on a relative difference between damage AE signals generated as a result of detection by the two AE sensors 11a and 11b.

Using two or more AE sensors 11a and 11b, the estimation unit 13 may detect a fatigue crack depth that is the depth of a fatigue crack part of the pressure accumulator 10 at the minimum initial flaw generation time point, from the damage AE signal. Furthermore, the estimation unit 13 may determine that a flaw crack whose size corresponds to the values of the damage AE signals that correspond to a fatigue damage degree is generated, and may estimate an allowable fatigue life of the pressure accumulator 10 from the above flaw crack.

Estimation Method of Life Estimation Apparatus 100 for Accumulator 10

Figure 3:
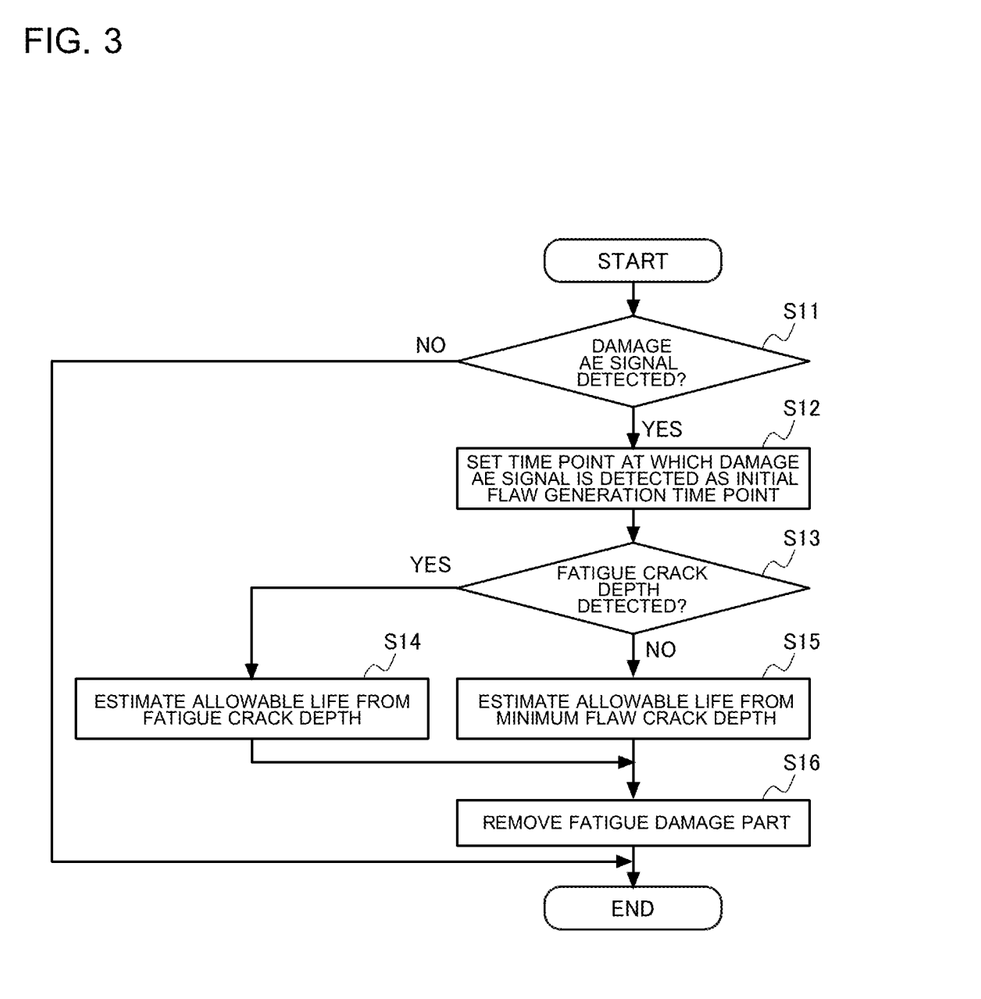
FIG. 3 is a flowchart of an estimation method for the life estimation apparatus for the pressure accumulator according to the example.

FIG. 3 is a flowchart indicating an estimation method of the life estimation apparatus 100 for the pressure accumulator 10 according to the example. The processing according to the estimation method may be applied only at the time when the safety inspection is performed. That is, it is not indispensable that the processing according to the estimation method is applied at all time.

In step S11, the two AE sensors 11a and 11b detect damage AE signals from the pressure accumulator 10, and the estimation unit 13 determines whether the damage AE signals are detected or not. When in step S11, the AE signals are detected, the step to be carried out proceeds to step S12. When in step S11, the AE signals are not detected, the processing ends. As described above, the detection of the damage AE signals from the pressure accumulator 10 by the two AE sensors 11a and 11b at least at a safety inspection frequency at which first damage AE signals can be detected when the size of a crack is smaller than or equal to at least 0.3 mm, which is the size of the minimum initial flaw that can be detected by the magnetic particle testing.

In step S12, when the AE sensors 11a and 11b detect damage AE signals generated from the pressure accumulator 10 because of damage of the material, the estimation unit 13 sets the time point at which the AE signals are detected, as the minimum initial flaw generation time point that is the time point at which the minimum initial flaw of the pressure accumulator 10 that is detected by the magnetic particle testing is generated in the shipping of the pressure accumulator 10. In this example, since the two AE sensors 11a and 11b are provided, the estimation unit 13 locates a fatigue damage part of the pressure accumulator 10 based on the relative difference between the damage AE signals detected by the two AE sensors 11a and 11b. After the process of step S12, the processing proceeds to step S13.

Figure 4:
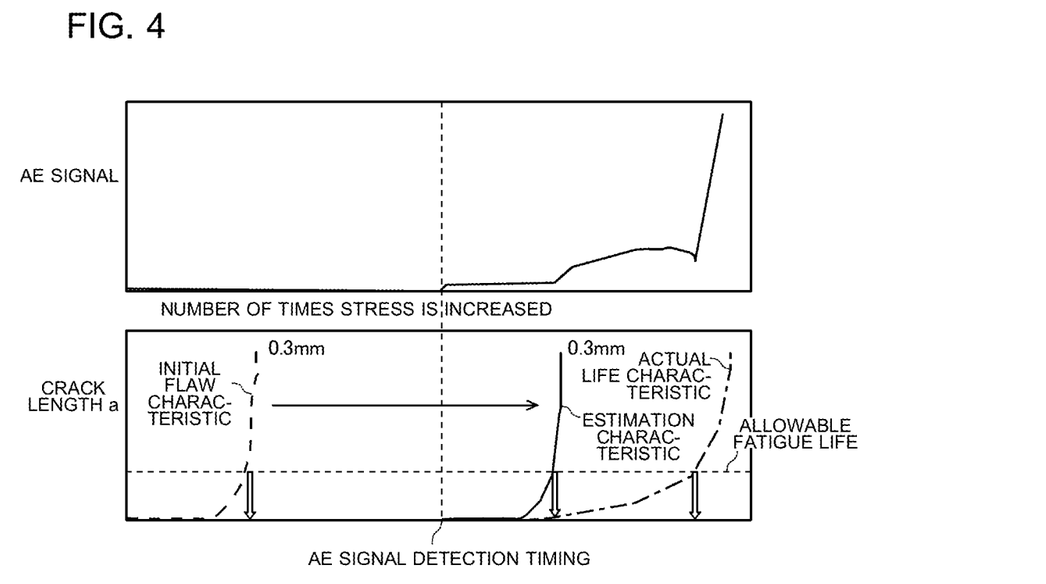
FIG. 4 is an explanatory diagram illustrating a correlation between AE signals detected by AE sensors and an estimation characteristic for the life of the pressure accumulator according to the example.

FIG. 4 is an explanatory diagram illustrating a correlation between the AE signals detected by the AE sensors 11a and 11b and an estimation characteristic for the life of the pressure accumulator 10 according to the example. As illustrated in FIG. 4, when the AE sensors 11a and 11b detect damage AE signals, the estimation unit 13 sets the time point at which the AE signals are detected, as the minimum initial flaw generation time point, that is, the time point at which a minimum initial flaw having a size of 0.3 mm which is detected by the magnetic particle testing is generated in the shipping of the pressure accumulator 10, whose fatigue characteristic is indicated by a dotted line. Then, the estimation unit 13 temporarily estimates an allowable fatigue life of the pressure accumulator 10 from the crack having a size of 0.3 mm, as an estimation characteristic that is indicated by a solid line. The estimation characteristic for the life obtained from the minimum initial flaw whose size is 0.3 mm is previously investigated. In this process, as a subsequent step is still present, the estimation characteristic is determined as a temporary estimation characteristic, and the allowable fatigue life of the pressure accumulator 10 is estimated. However, the allowable fatigue life of the pressure accumulator 10 may be definitely set based on the estimation characteristic. As a result, the estimation characteristic further approaches an actual life characteristic of an actual life, which is indicated by a dash-dot-dash line in the figure. Then, it is possible to estimate an allowable fatigue life closer to the actual life.

In step S13, the non-destructive sensor 12, according to the eddy current testing, detects the fatigue crack depth that is the depth of the fatigue damage part pf the pressure accumulator 10 at the minimum initial flaw generation time point, and the estimation unit 13 determines whether the fatigue crack depth is detected. When in step S13, the fatigue crack depth is detected, the processing proceeds to step S14. When in step S13, the fatigue crack depth is not detected, the processing proceeds to step S15.

In step S13, the AE sensors 11a and 11b may detect, from the damage AE signals, the fatigue crack depth of the fatigue damage part of the pressure accumulator 10 at the minimum initial flaw generation time point.

In step S14, the estimation unit 13 determines that the fatigue crack detected by the non-destructive sensor 12 according to the eddy current testing is generated, and estimates the allowable fatigue life of the pressure accumulator 10 from the fatigue crack. As described later, the size of the minimum flaw crack that is detected by the non-destructive sensor 12 according to the eddy current testing is 0.1 mm. Therefore, the fatigue crack to be detected in step S14 has a depth of 0.1 mm or more. Thus, it is determined as a prediction that a fatigue damage will be generated based on a previously investigated fatigue damage characteristic obtained from the fatigue crack detected by the non-destructive sensor 12, and the life of the pressure accumulator 10 is estimated.

Even when the fatigue damage characteristic from the fatigue crack is not clarified, the minimum flaw crack detected by the non-destructive sensor 12 according to the eddy current testing is 0.1 mm as described later, and the minimum flaw characteristic from the minimum flaw crack is previously investigated and clarified. Therefore, the fatigue damage characteristic may be estimated based on the comparison between the minimum flaw characteristic from the minimum flaw crack having a size of 0.1 mm that is detected by the eddy current testing and the estimation characteristic from the initial flaw having a size of 0.3 mm that is detected by the magnetic particle testing in step S12.

Step S14 may be carried out when for the estimation unit 13, the AE sensors 11a and 11b detects from the damage AE signals, the fatigue crack depth of the fatigue damage part of the pressure accumulator 10 at the minimum initial flaw generation time point. In this example, the estimation unit 13 determines that a flaw crack whose size corresponds to the values of the AE signals detected by the AE sensors 11a and 11b that correspond to the fatigue damage degree is generated. Then, the estimation unit 13 estimates the allowable fatigue life of the pressure accumulator 10 from the above flaw crack. The fatigue damage characteristic that is referred to in the estimation of the allowable fatigue life of the pressure accumulator 10 may be obtained in the same manner as in step S14. After step S14, the processing may end. The processing may proceed to step S16.

Since in step S13, the fatigue crack depth is not detected by the non-destructive sensor 12 according to the eddy current testing in step S13, in step S15, the estimation unit 13 determines that a crack having a size of 0.1 mm, which is the size of the minimum flaw crack that is detected at the minimum initial flaw generation time point by the non-destructive sensor 12 according to the eddy current testing is generated. The estimation unit 13 estimates the allowable fatigue life of the pressure accumulator 10 based on the minimum flaw characteristic from the minimum flaw crack. After step S15, the processing may end. The processing may proceed to step S16.

Figure 5:
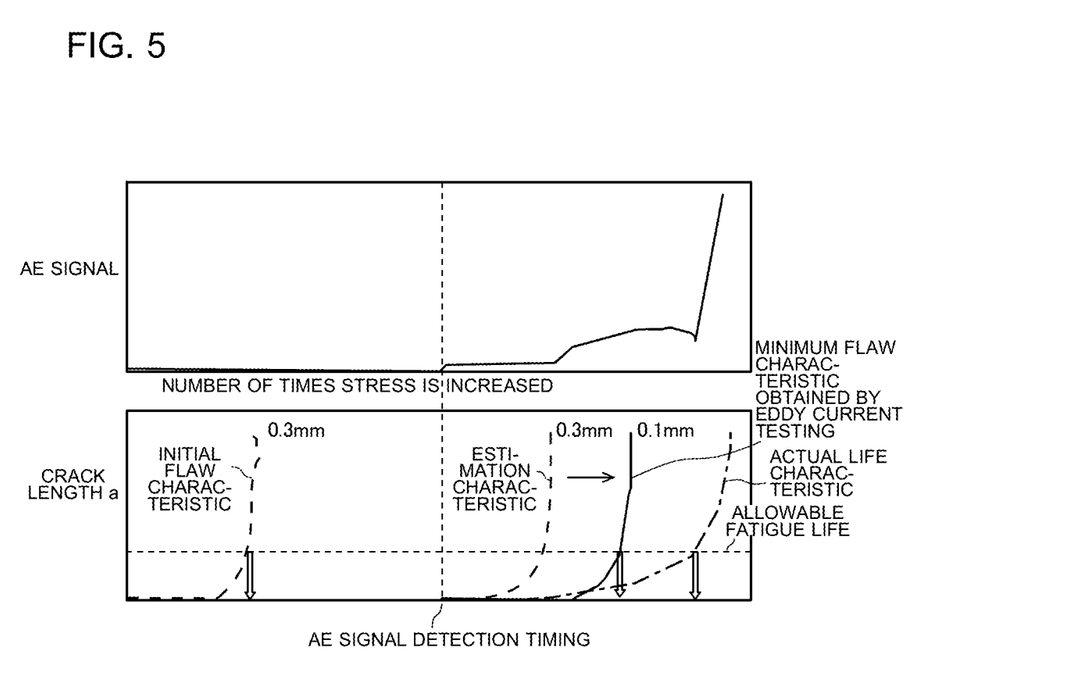
FIG. 5 is an explanatory diagram illustrating a correlation between the AE signals detected by the AE sensors and a minimum flaw characteristic for the life of the pressure accumulator based on an eddy current testing, according to the example.

FIG. 5 is an explanatory diagram illustrating a correlation between AE signals detected by the AE sensors 11a and 11b and the minimum flaw characteristic for the life of the pressure accumulator 10, according to the eddy current testing in the example. As illustrated in FIG. 5, since the fatigue crack depth is not detected by the non-destructive sensor 12 according to the eddy current testing, the estimation unit 13 determines the point of time at which first damage AE signals are detected, as the point of time at which a crack having a size of 0.1 mm which is the minimum flaw crack that can be detected by the non-destructive sensor 12 according to the eddy current testing is generated. Then, the estimation unit 13 estimates the allowable fatigue life of the pressure accumulator 10 from the minimum flaw crack having a size of 0.1 mm, from the temporal estimation characteristic that is indicated by a broken line, as a minimum flaw characteristic obtained using the non-destructive sensor 12 according to the eddy current testing, the minimum flaw characteristic being indicated by a solid line in the figure. The minimum flaw characteristic obtained using the non-destructive sensor 12 according to the eddy current testing is previously investigated. As a result, the minimum flaw characteristic further approaches the actual life characteristic indicated by a dash-dot-dash line in the figure, than the estimation characteristic. Then, it is possible to estimate an allowable fatigue life that is further close to the actual life.

In step S16, when the AE sensors 11a and 11b detect damage AE signals, a worker removes a fatigue damage part, for example, by polishing, to extend the life of the pressure accumulator 10. The fatigue damage part is located from the difference between the damage AE signals detected by the AE sensors 11a and 11b. Therefore, since the depth of the fatigue crack at the time when first damage AE signals are detected is considered smaller than or equal to 0.3 mm, which is the size of the minimum crack depth according to the magnetic particle testing, a fatigue crack itself on an inner surface side of the metallic cylinder member 1a is removed. Therefore, the fatigue damage part is removed, and the life of the pressure accumulator 10 can be further extended. After step S16, the processing ends.

Modification of Life Estimation Apparatus 100 for Pressure Accumulator 10

Figure 6:
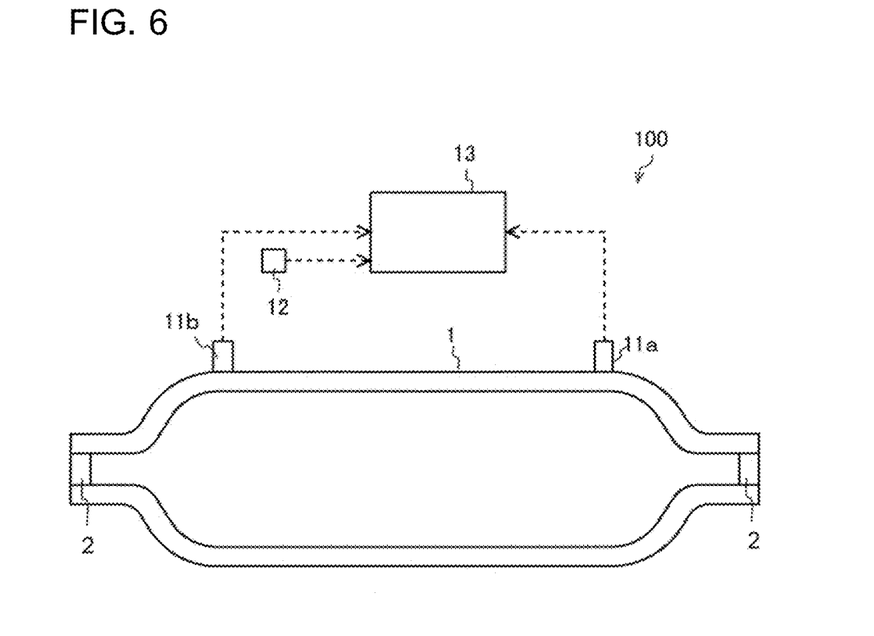
FIG. 6 is a schematic configuration diagram illustrating a life estimation apparatus for a pressure accumulator, in a modification of the example.

FIG. 6 is a schematic configuration diagram illustrating a life estimation apparatus 100 for a pressure accumulator 10, according to a modification of the example. The configurations of components other than the pressure accumulator 10 are the same as the configurations described above regarding the above example, and their descriptions will thus be omitted. The following description is made concerning configurations of the pressure accumulator 10 that are not described above.

In the container 1, at least one end side may be smaller in diameter than the body. FIG. 6 illustrates an example of the container 1 in which the both end sides of the container 1 are smaller in diameter than the body. In this example, the end sides of the container 1 are small in diameter and formed hemispherically, forming shoulder portions of a tank type container. Lid members 2 are provided at opened portions of the both end portions of the container 1. Since the container 1 is a tank type container, the two AE sensors 11a and 11b are provided at the container 1.

EXAMPLE

Figure 7:
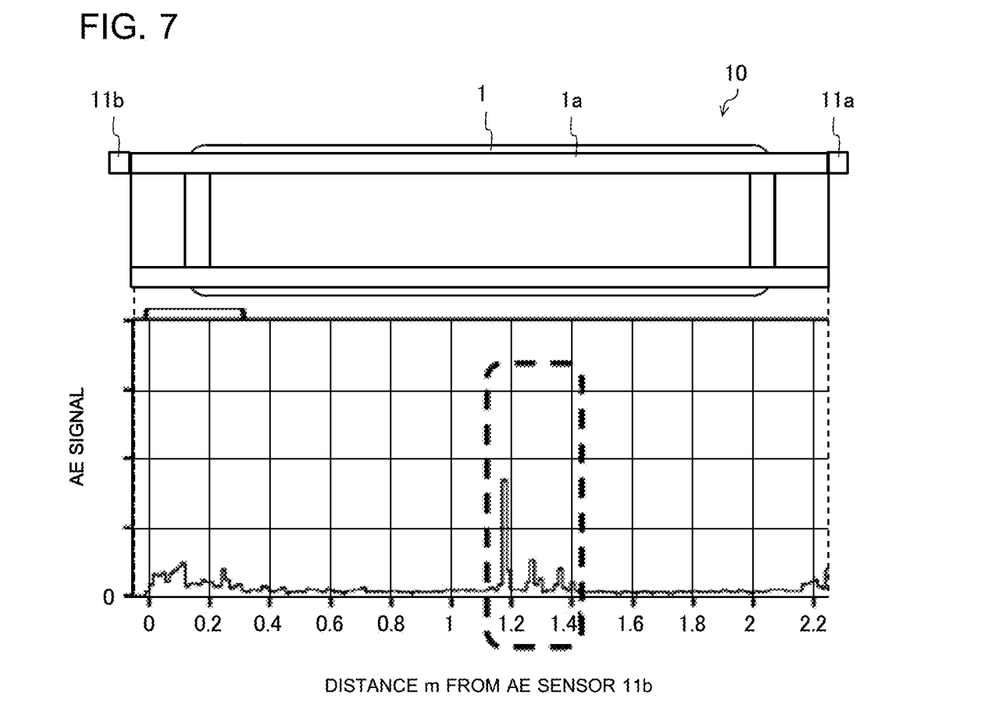
FIG. 7 is an explanatory diagram indicating a location result based on AE signals detected by AE sensors in an example.

FIG. 7 is an explanatory diagram illustrating a location result based on the AE signals from two AE sensors 11a and 11b in an example. We performed a position location based on AE signals detected by the two AE sensors 11a and 11b using the life estimation apparatus 100 for the pressure accumulator 10 according to the example and, as illustrated in FIG. 7, a damage part which causes a damage AE signal to be generated and whose fatigue crack depth is very shallow could be detected. The location result as indicated in FIG. 7 was obtained by the process of step S11 in the flowchart of FIG. 3.

After the location result in FIG. 7 was obtained, the point of time at which the damage AE signal was detected was set as the initial flaw generation time point by the process of step S12 in the flowchart of FIG. 3, and the fatigue crack depth was detected by the non-destructive sensor 12 according to the eddy current testing in the process of step S13. The damage part was detected as a flaw that has a size of 0.1 mm from the inner surface of the container 1 of the pressure accumulator 10, in the vicinity of the center in the longitudinal direction of the container 1, by the non-destructive sensor 12 according to the eddy current testing (ET). The total length of the container 1 was 2.2 m. The damage part appeared in a range indicated by a broken line in FIG. 7, and was conspicuous at a position located from the AE sensor 11b by approximately 1.2 m. The damage part could not be detected from the inner surface or outer surface of the container 1 by ultrasonic testing (UT) and penetrant testing (PT) that have been used in the past.

Figure 8:
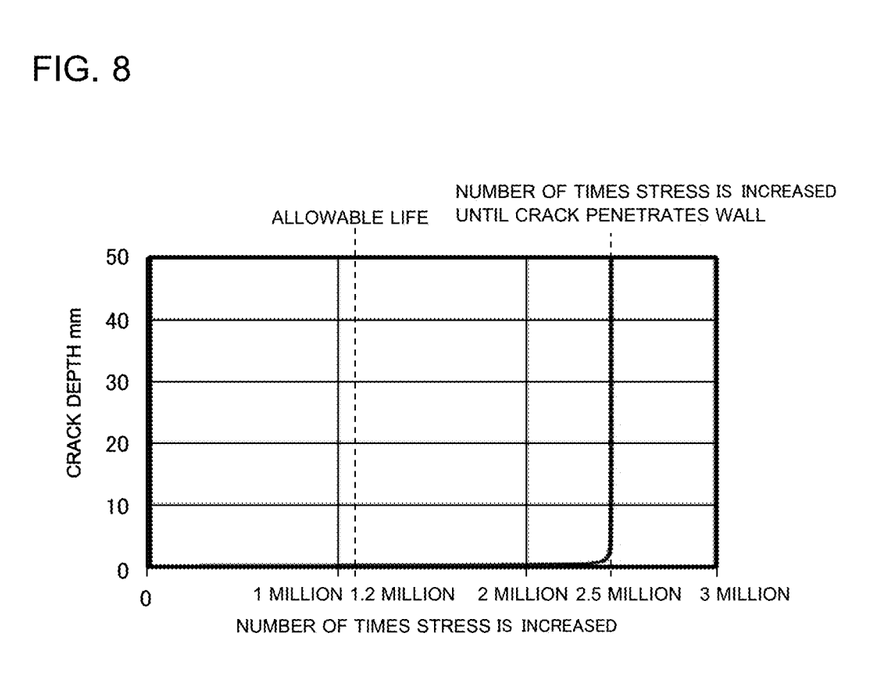
FIG. 8 is an explanatory diagram illustrating the result of estimation of an allowable life in the example.

FIG. 8 is an explanatory diagram illustrating the result of estimation of the allowable life in the example. As indicated in FIG. 8, the allowable life from the fatigue crack depth could be estimated in the process of step S14. To be more specific, after the 0.1 mm flaw is detected, this flaw was set as the initial flaw, and analyzed how much the flaw grows due to cyclic fatigue. The analysis method complies with KHKS 0220 (2016) standard regarding ultra-high pressure gas facilities that is set by the High Pressure Gas Safety Institute of Japan. As a result, the number of repetitions that is the number of times the internal pressure was raised so that the flaw grow to penetrate the container 1 having a thickness of 50 mm was approximately 2.5 million. An allowable cycle life defined as a life for which a safety factor is considered is estimated to be half of a cycle life in which the depth of the flaw reaches a value obtained by multiplying the thickness of the container 1 by 0.8. To be more specific, the allowable number of repetitions is approximately 1.2 million, which is half of a cycle number of approximately 2.5 million that is the number of repetitions required until the depth of the crack reaches 40 mm that is a value obtained by multiplying 50 mm that is the thickness of the container 1, by 0.8 that is the safety factor. As described above, the estimation of the allowable life from the fatigue crack depth that is made as the process of step S14 could be verified.

Method of Manufacturing Pressure Accumulator 10

To use the life estimation apparatus 100 for the pressure accumulator 10 as described above, it is necessary to design the pressure accumulator 10 such that the AE sensors 11a and 11b prominently generate damage AE signals when the pressure accumulator 10 is damaged due to fatigue. A method of manufacturing the pressure accumulator 10 in which the pressure accumulator 10 is manufactured by using a damage AE signal for the pressure accumulator 10 that is generated such that a damage AE signal is prominently generated when the pressure accumulator 10 is damaged due to fatigue will be described below.

Figure 9:
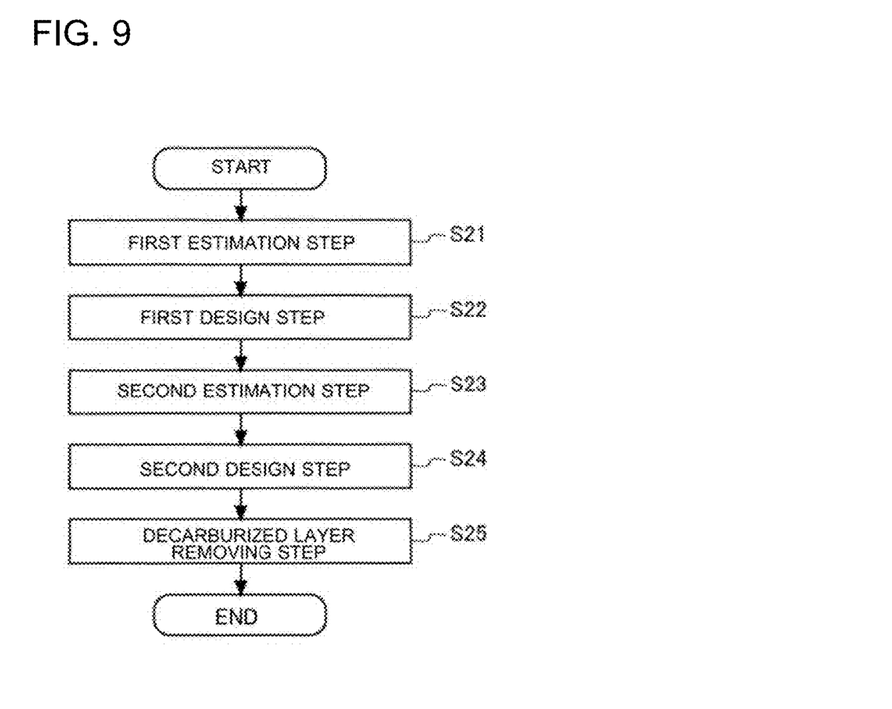
FIG. 9 is a flowchart indicating a method of manufacturing the pressure accumulator according to the example.

FIG. 9 is a flowchart indicating the method of manufacturing the pressure accumulator 10 according to the example. As indicated in FIG. 9, the method of manufacturing the pressure accumulator 10 includes a first estimation step S21, a first design step S22, a second estimation step S23, a second design step S24, and a decarburized-layer removal step S25.

First Estimation Step S21

In the first estimation step S21, the AE sensors 11a and 11b provided at the pressure accumulator 10 estimate the range of stress levels at each of which a damage AE signal that is generated from the pressure accumulator 10 because of the damage of the material of the pressure accumulator 10 is in a predetermined state in which a damage AE signal is prominently generated.

Figure 10:
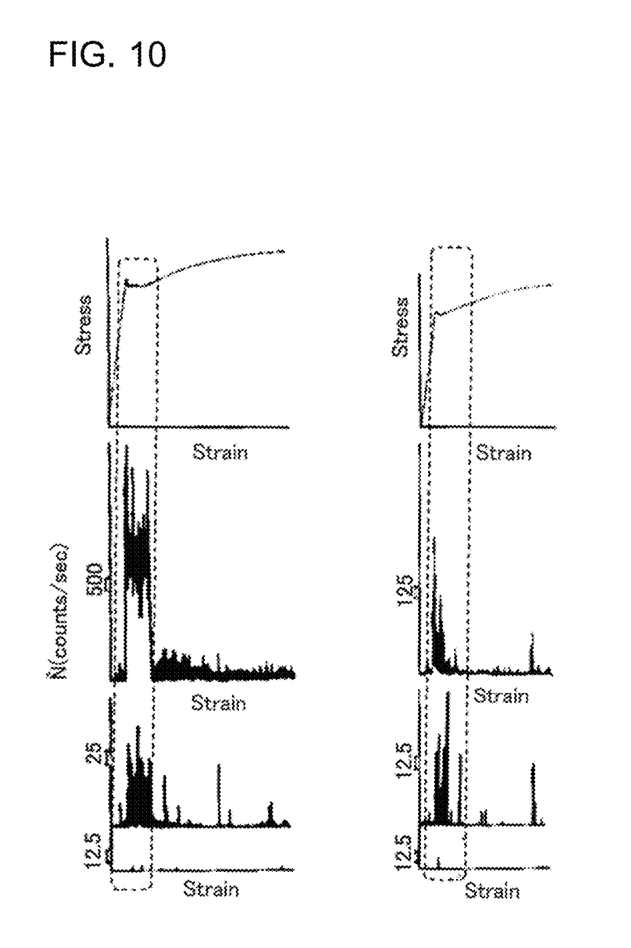
FIG. 10 is a diagram indicating a correlation between the elastic deformation and plastic deformation of metal and the state of generation of a damage AE signal in the example.
Figure 11:
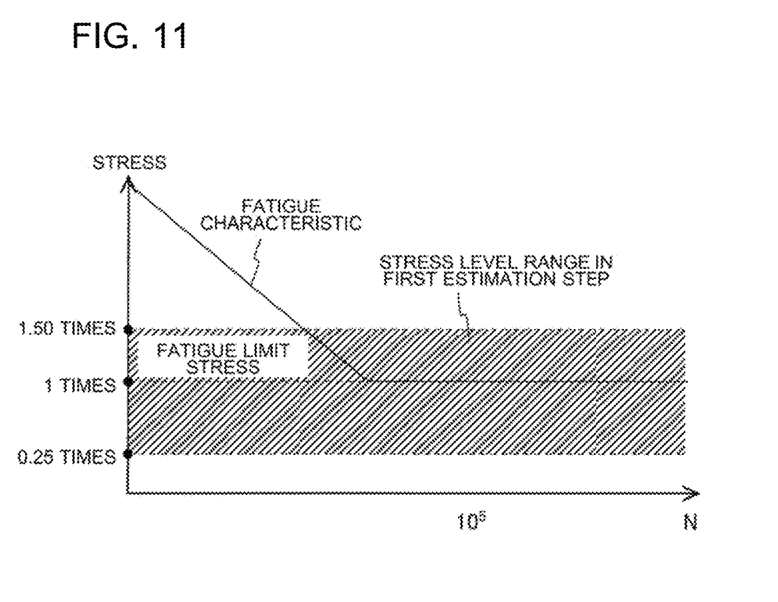
FIG. 11 is an explanatory diagram indicating a stress level range in a first estimation step in the example.

FIG. 10 is a diagram indicating a correlation between the elastic deformation and plastic deformation of metal and the state of generation of a damage AE signal in the example. FIG. 11 is an explanatory diagram indicating a stress level range in the first estimation step S21 in the example.

The graph of FIG. 10 indicates the state of generation of a damage AE signal in a tensile test conducted only once. As a phenomenon that occurs at metal of which the container 1 of the pressure accumulator 10 is made, it is known that a damage AE signal is prominently generated in a process in which the state of the metal changes from elastic deformation to plastic deformation as indicated in FIG. 10 and, from conventional knowledge, it can be seen that generation of a damage AE signal does not prominently occur in an elastic deformation range in which the state of metal is elastic deformation.

We paid attention to the fatigue failure in which that a failure occurs at the elastic deformation range, and discovered that an AE signal is generated when damage occurs because of fatigue, even in the elastic deformation range, when the stress level is in a specific stress range.

Thus, in the first estimation step S21, the characteristic of the metal as indicated in FIG. 8 is previously investigated, and a range between an upper limit and lower limit of a fatigue critical stress is estimated. To be more specific, as indicated in FIG. 11, in the first estimation step S21, the AE sensors 11a and 11b provided at the pressure accumulator 10 estimate that the stress level at which a damage AE signal generated from the pressure accumulator 10 because of the damage of the material is in the predetermined state in which an AE signal is prominently generated falls within the range between stress levels that are 0.25 times to 1.50 times higher than the level of the fatigue limit stress. When the stress level is less than the stress level that is 0.25 times higher than the level of the fatigue limit stress, the amount of the damage AE signal that is generated because of the damage of the material is small. When the stress level is higher than the stress level that is 1.50 times higher than the level of the fatigue limit stress, a damage AE signal generated because of the plastic deformation of the material cannot be detected. Therefore, a hatched range as illustrated in the figure is estimated.

First Design Step S22

In the first design step S22, the pressure accumulator 10 is designed such that the minimum thickness of the pressure accumulator 10 is determined based on the stress level estimated in the first estimation step S21. Therefore, the minimum thickness is determined such that the stress level at which a damage AE signal generated from the pressure accumulator 10 because of the damage of the material is in the predetermined state in which a damage AE signal is prominently generated can be applied to the minimum thickness.

Second Estimation Step S23

The pressure accumulator 10 is sealed, with hydrogen enclosed in the pressure accumulator 10. In view of this point, a fatigue limit until which hydrogen degradation in the fatigue characteristic does not become apparent is estimated based on the influence of hydrogen on the fatigue characteristic of the material of the pressure accumulator 10.

Figure 12:
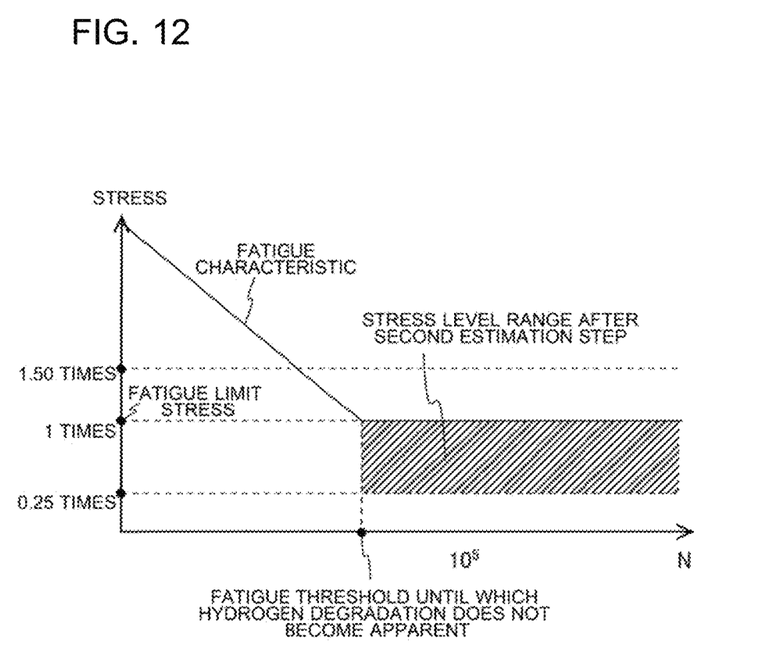
FIG. 12 is an explanatory diagram indicating a stress level range after the first estimation step and a second estimation step in the example.

FIG. 12 is an explanatory diagram indicating a stress level range after the first estimation step S21 and the second estimation step S23 in the example. As illustrated in FIG. 12, in consideration of the fatigue limit until which the hydrogen degradation in the fatigue characteristic does not become apparent, the range estimated in the first estimation step S21 is further limited, and a hatched range as indicated in the figure is estimated.

Second Design Step S24

In the second design step S24, the pressure accumulator 10 is designed such that the minimum thickness is determined based on a stress level that is lower than or equal to the fatigue limit estimated in the second estimation step S23. As a result, the determined minimum thickness is suitable for when hydrogen is enclosed in the pressure accumulator 10.

Decarburized-Layer Removal Step S25

In the decarburized-layer removal step S25, in the pressure accumulator 10 produced through the steps to the second design step S24, a decarburized layer on at least the inner surface of the surfaces of the material of the pressure accumulator 10, that is, of the inner surface and outer surface of the material, is removed.

Figure 13:
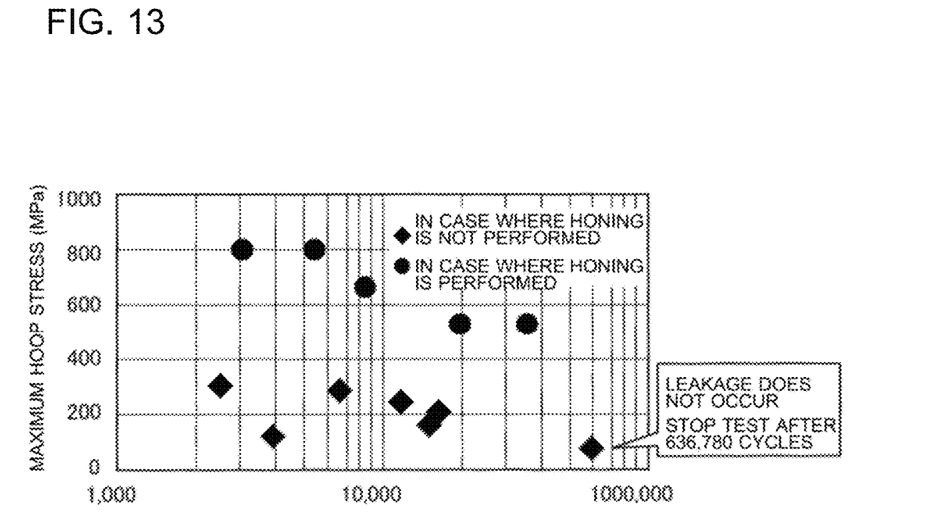
FIG. 13 is an explanatory diagram indicating stress characteristics depending on whether or not honing processing is performed on an inner surface of a container according to the example.
Figure 14:
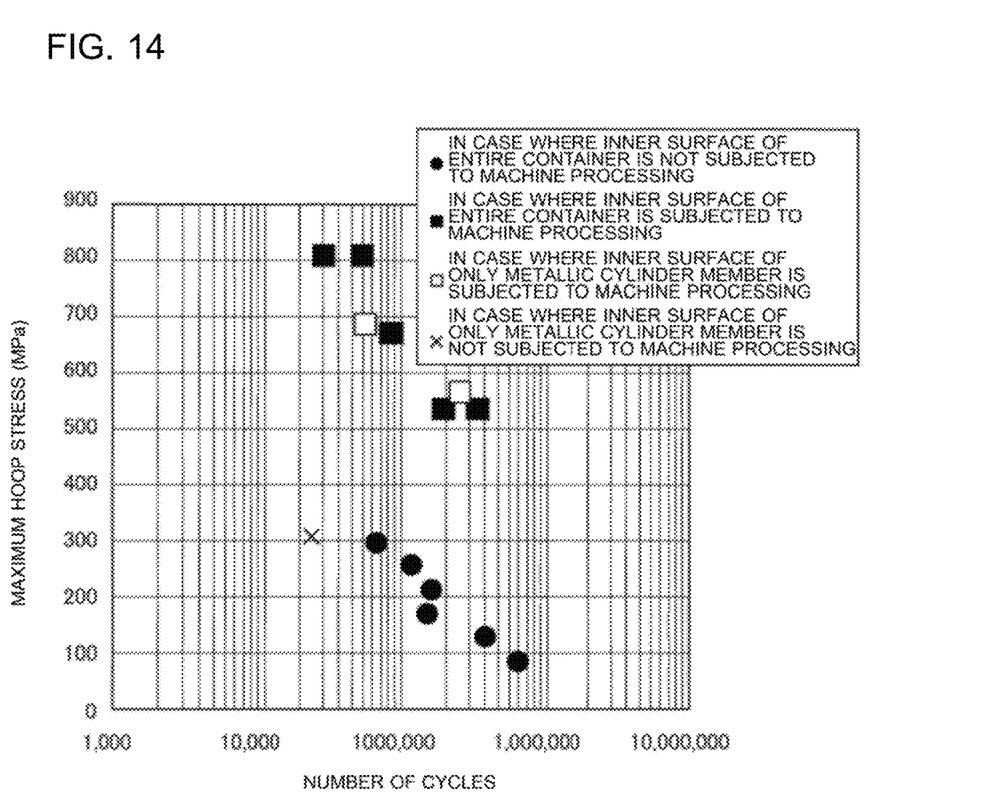
FIG. 14 is an explanatory diagram indicating stress characteristics depending on whether or not machine processing is performed on an inner surface of the entire container is performed or whether or not machine processing is performed on an inner surface of only a metallic cylinder member according to the example.

FIG. 13 is an explanatory diagram indicating stress characteristics depending on whether or not honing processing is performed on the inner surface of the container 1 according to the example. FIG. 14 is an explanatory diagram indicating stress characteristics depending on whether or not machine processing is performed on the inner surface of the entire container 1 or whether or not the machine processing is performed on the inner surface of only the metallic cylinder member 1a according to the example.

As illustrated in FIGS. 13 and 14, in the pressure accumulator 10, by performing the honing or machine processing on the inner surface, the decarburized layer on the material of the pressure accumulator 10 is removed, and the stress tolerability is improved. As a result, the life of the pressure accumulator 10 can be extended.

Advantages of the Example

According to the example, in the method of manufacturing the pressure accumulator 10, the pressure accumulator 10 is produced while using AE signals for the pressure accumulator 10. The method of manufacturing the pressure accumulator 10 includes the first estimation step S21 in which the AE sensors 11a and 11b provided at the pressure accumulator 10 estimate the range of the stress levels at each of which a damage AE signal generated from the pressure accumulator 10 because of the damage of the material of the pressure accumulator 10 is in the predetermined state. The method of manufacturing the pressure accumulator 10 includes the first design step S22 of designing the pressure accumulator 10 such that the minimum thickness is determined based on the stress level estimated in the first estimation step S21.

By virtue of the above configuration, when the pressure accumulator 10 is damaged due to fatigue and in use, the AE sensors 11a and 11b detect damage AE signals from the pressure accumulator 10, whose signal degrees are each the prominent signal degree in which the AE signals are in the predetermined state. Therefore, even in the pressure accumulator 10 whose life is determined as a diagnosis, for example, only by annual safety inspection, the AE signal can be reliably detected without fail, in the safety inspection.

According to the example, in the first estimation step S21, the AE sensors 11a and 11b provided at the pressure accumulator 10 estimate that the stress level at which a damage AE signal generated from the pressure accumulator 10 because of the damage of the material is in the predetermined state falls within the range of stress levels that are 0.25 times to 1.50 times higher than the level of the fatigue limit stress.

In the above configuration, when the pressure accumulator 10 is damaged due to fatigue and is in use, the AE sensors 11a and 11b detect, from the pressure accumulator 10, damage AE signals whose signal degrees are each the prominent signal degree in which the stress level is in the range of stress levels that are 0.25 times to 1.50 times higher than the level of the fatigue limit stress so that the damage AE signals are in the predetermined state. When the stress level is lower than the level that is 0.25 times higher than the level of the fatigue limit stress, the amount of the damage AE signal generated because of the damage of the material is small. When the stress level is higher than the level that is 1.50 times higher than the level of the fatigue limit stress, a damage AE signal that is generated because of the plastic deformation of the material cannot be detected.

According to the example, the method of manufacturing the pressure accumulator 10 includes the second estimation step S23 of estimating the fatigue limit until which the hydrogen degradation in the fatigue characteristic does not become apparent, based on the influence of hydrogen on the fatigue characteristic of the material of the pressure accumulator 10. The method of manufacturing the pressure accumulator 10 includes the second design step S24 of designing the pressure accumulator 10 such that the minimum thickness of the pressure accumulator 10 is determined based on a stress level that is lower than or equal to the fatigue limit estimated in the second estimation step S23.

In the above configuration, when the pressure accumulator 10 is damaged due to fatigue and in use, the AE sensors 11a and 11b detect AE signals from the pressure accumulator 10 that are in a state in which the stress level is lower than or equal to the fatigue limit until which the hydrogen degradation is not made apparent by the influence of the hydrogen enclosed in the pressure accumulator 10. Therefore, the pressure accumulator 10 is designed suitable for hydrogen enclosed in the pressure accumulator 10.

According to the example, the method of manufacturing the pressure accumulator 10 includes the decarburized-layer removal step S25 of removing the decarburized layer on at least the inner surface of the surfaces of the base material of the pressure accumulator 10, that is, of the inner surface and outer surface of the base material.

In the above configuration, the decarburized layer is removed from the base material of the pressure accumulator 10, and the stress tolerability of the pressure accumulator 10 can be improved. Furthermore, when the pressure accumulator 10 is damaged due to fatigue and in use, the AE sensors 11a and 11b can more accurately detect damage AE signals from the pressure accumulator 10, whose signal degrees are each the prominent signal degree in which the AE signals are in the predetermined state.

According to the example, the pressure accumulator 10 includes the AE sensors 11a and 11b that are provided at the pressure accumulator 10 and detect AE signals.

In the above configuration, when the pressure accumulator 10 is damaged due to fatigue and in use, the AE sensors 11a and 11b can detect AE signals from the pressure accumulator 10, whose signal degrees are each the prominent signal degree in which the AE signals are in the predetermined state.

According to the example, the pressure accumulator 10 includes the container 1 that is made of metal and has opened portions. The pressure accumulator 10 includes the lid members 2 that are provided at the opened portions of the container 1 to close the opened portions.

In the above configuration, when the container 1 is damaged due to fatigue and in use, the AE sensors 11a and 11b can detect AE signals from the container 1, whose signal degrees are each the prominent signal degree in which the AE signals are in the predetermined state.

According to the example, the AE sensors 11a and 11b are provided at one or both of the container 1 and the lid members 2.

In the above configuration, when the container 1 is damaged due to fatigue and in use, the AE sensors 11a and 11b can detect AE signals from the container 1.

The container 1 is the metallic cylinder member 1a. The opening portions of the both end portions of the metallic cylinder member 1a are closed by the lid members 2.

In the above configuration, when the metallic cylinder member 1a is damaged due to fatigue and in use, the AE sensors 11a and 11b can detect AE signals from the metallic cylinder member 1a.

According to the above example, the pressure accumulator 10 includes the carbon-fiber reinforced resin member 4 that covers the outer circumferential portion of the metallic cylinder member 1a.

In the above configuration, since the carbon-fiber reinforced resin member 4 covers the outer circumferential portion of the metallic cylinder member 1a, the durability of the metallic cylinder member 1a can be improved.

The invention claimed is:

1. A method of manufacturing a pressure accumulator, using an AE signal for the pressure accumulator, the method comprising:
   a first estimation step of estimating with an AE sensor provided at the pressure accumulator, a range of stress levels at each of which a damage AE signal generated from the pressure accumulator because of damage of material of the pressure accumulator is in a predetermined state; and
   a first design step of designing the pressure accumulator such that a minimum thickness of the pressure accumulator is determined based on the stress level range estimated in the first estimation step,
   wherein in the first estimation step, the AE sensor provided at the pressure accumulator estimates that the range of the stress levels at each of which the damage AE signal generated from the pressure accumulator because of the damage of the material is in the predetermined state is a range between stress levels that are 0.25 times to 1.50 times higher than the level of a fatigue limit stress.

2. The method of claim 1, further comprising:
   a second estimation step of estimating a fatigue limit until which hydrogen degradation in the fatigue characteristic does not become apparent, based on influence of hydrogen on a fatigue characteristic of the material of the pressure accumulator; and
   a second design step of designing the pressure accumulator such that the minimum thickness of the pressure accumulator is determined based on a stress level lower than or equal to the fatigue limit estimated in the second estimation step.

3. A method of manufacturing a pressure accumulator, using an AE signal for the pressure accumulator, the method comprising:
   a first estimation step of estimating with an AE sensor provided at the pressure accumulator, a range of stress levels at each of which a damage AE signal generated from the pressure accumulator because of damage of material of the pressure accumulator is in a predetermined state; and
   a first design step of designing the pressure accumulator such that a minimum thickness of the pressure accumulator is determined based on the stress level range estimated in the first estimation step, and
   a removal step of removing a decarburized layer on at least an inner surface of the inner surface and an outer surface of a base material of the pressure accumulator.

4. The method of claim 1, wherein the pressure accumulator includes an AE sensor provided at the pressure accumulator and configured to detect the AE signal.

5. The method of claim 1, wherein the pressure accumulator includes:
   a container made of metal and having an opened portion; and
   a lid member provided at the opened portion of the container to close the opened portion.

6. The method of claim 5, wherein AE sensors including the AE sensor are provided at one or both of the container and the lid member.

7. The method of claim 5, wherein
   the container is a metallic cylinder member having both end portions that are opened, and
   lid members including the lid member are provided to close the opened portions of the both end portions of the metallic cylinder member.

8. The method of claim 7, wherein the pressure accumulator comprises a carbon-fiber reinforced resin member that covers an outer circumferential portion of the metallic cylinder member.

\* \* \* \* \*